(12) United States Patent
Karabchevsky

(10) Patent No.: US 10,852,231 B2
(45) Date of Patent: Dec. 1, 2020

(54) METHOD AND DEVICE FOR NEAR-INFRARED SPECTROSCOPY

(71) Applicant: B.G. Negev Technologies & Applications Ltd., at Ben-Gurion University, Beer-Sheva (IL)

(72) Inventor: Alina Karabchevsky, Haifa (IL)

(73) Assignee: B.G. Negev Technologies and Applications Ltd., at Ben-Gurion University, Beer-Sheva (IL)

( * ) Notice: Subject to any disclaimer, the term of this patent is extended or adjusted under 35 U.S.C. 154(b) by 0 days.

(21) Appl. No.: 16/312,698

(22) PCT Filed: Jun. 25, 2017

(86) PCT No.: PCT/IL2017/050703
§ 371 (c)(1),
(2) Date: Dec. 21, 2018

(87) PCT Pub. No.: WO2018/002914
PCT Pub. Date: Jan. 4, 2018

(65) Prior Publication Data
US 2019/0162659 A1 May 30, 2019

Related U.S. Application Data

(60) Provisional application No. 62/354,758, filed on Jun. 26, 2016.

(51) Int. Cl.
G01N 21/359 (2014.01)
G01N 21/3577 (2014.01)
G01J 3/10 (2006.01)

(52) U.S. Cl.
CPC ............. *G01N 21/359* (2013.01); *G01J 3/10* (2013.01); *G01N 21/3577* (2013.01)

(58) Field of Classification Search
CPC ..... G01J 3/10; G01N 21/3577; G01N 21/359; G01N 33/54346
See application file for complete search history.

(56) References Cited

U.S. PATENT DOCUMENTS 7,218,822 B2 *  5/2007  Treado ............... A61B 1/00165
                                                          356/301
2015/0320895 A1 * 11/2015  Sun ......................... B01J 13/22
                                                            600/8

(Continued)

OTHER PUBLICATIONS

International Search Report and Written Opinion received in PCT Application No. PCT/IL2017/050703, dated Oct. 19, 2017.

(Continued)

*Primary Examiner* — David P Porta
*Assistant Examiner* — Fani Boosalis
(74) *Attorney, Agent, or Firm* — Knobbe, Martens, Olson & Bear LLP

(57) ABSTRACT

The invention provides a method of analyzing a liquid sample, comprising the steps of: passing near-infrared light through the sample, wherein the light travels in metal nanoparticles-added microfiber that is immersed in the sample; obtaining spectral information across a wavelength range of about 750 nm to about 1800 nm; and qualitatively identifying, and optionally quantitatively characterizing, one or more analytes in the sample. Near-infrared spectrophotometer carry out the method is also provided by the invention.

8 Claims, 6 Drawing Sheets

(56) References Cited

U.S. PATENT DOCUMENTS

2016/0303517 A1* 10/2016 Diallo .................. B01D 61/145
2018/0354815 A1* 12/2018 Poler ........................ B01J 39/19

OTHER PUBLICATIONS

Brambrilla, G.: "Optical fibre nanowires & microwires: a review;" Journal of Optics. 12 (4), 2010.
Birks et al: "The Shape of Fiber Tapers;" Journal of Lightwave Technology, 10 (4), pp. 432-438, 1992.
Karabchevsky, A. et al: "Broadband near-infrared spectroscopy of organic molecules on compact photonic devices", May 7, 2015.
Karabchevsky, A. et al: "Giant absorption of light by molecular vibrations on a chip"; Scientific Reports, Feb. 18, 2016.

* cited by examiner

METHOD AND DEVICE FOR NEAR-INFRARED SPECTROSCOPY

CROSS REFERENCE TO RELATED APPLICATIONS

This application is the U.S. National Phase under 35 U.S.C. § 371 of International Application No. PCT/IL2017/050703 filed Jun. 25, 2017, designating the U.S. and published as WO 2018/002914 A1 on Jan. 4, 2018, which claims the benefit of U.S. Provisional Application No. 62/354,578 filed Jun. 26, 2016. Any and all applications for which a foreign or domestic priority claim is identified above and/or in the Application Data Sheet as filed with the present application are hereby incorporated by reference under 37 CFR 1.57.

Molecules can absorb near-infrared radiation (the 750-2, 500 nm region of the electromagnetic spectrum). Absorption of near-infrared (NIR) radiation corresponds to certain vibrations of the molecule and is due to overtones of the fundamental vibrations that are found in the infrared region (2,500-25,000 nm). Overtones are the transitions between the ground state and the second (or higher) excited vibrational states, and are weaker than the corresponding fundamental absorptions in the infrared (IR) spectrum. However, NIR spectroscopy has many advantages and it could gain commercial acceptance as an efficient analytical tool, and not just as a complementary technique to conventional IR, if only its sensitivity could be improved.

Aromatic amines are potentially detectable by NIR spectroscopy due to overtones associated with the fundamental infrared absorption related to the N—H bond of the amine functional group. Aromatic amines, being the building blocks of aromatic amino acids, can be used to quantify the concentration of essential proteins in natural products, functional materials, and plants. The detection of these compounds is, therefore, a prominent topic in organic chemistry, with broad biomedical and industrial applications. Hence there exists a need for an efficient NIR spectroscopy detection method, to benefit from the fingerprint of aromatic amines in NIR spectra.

To demonstrate that aromatic amines could be detected with the aid of NIR spectroscopy, FIG. 1 is provided showing the NIR spectrum of an illustrative aromatic amine (N-methyl aniline) measured with conventional spectrophotometer. Transmittance spectra of pure N-methyl aniline (NMA) measured by Jasco V570 spectrophotometer was recorded at ~21±2° C. and converted to dB units. The sample holder was quartz cuvette with pathlength of 10 mm (shown in FIG. 1*b*: the light is hitting the cuvette at a normal incidence). The "fingerprints" of N-methyl aniline are readily seen in the transmittance spectrum of FIG. 1*a*. The absorption bands at ~1500 nm and ~1700 nm are assigned to the N—H bond of the amine group and the C—H bond of the aromatic ring, respectively. The transmittance spectrum of hexane is also provided in FIG. 1*a*.

The present invention offers an alternative to the conventional NIR spectroscopy technique that was used to generate the spectrum shown in FIG. 1*a*. The method of the invention is based on the interaction of light travelling through a modified microfiber immersed in a medium consisting of the analyte sample. An optical fiber is a cylindrical waveguide having a core surrounded with a layer (called cladding) of a slightly lower refractive index. The fibers can be modified, e.g., by removing the cladding, bending or tapering the fiber, and further incorporating sensitive materials, to greatly improve their sensitivity to external medium. Recent advances in sensing applications, especially spectroscopic applications, include techniques based on surface sensing, such as enhanced chemiluminescence, surface-enhanced fluorescence spectroscopy, Raman scattering spectroscopy, and absorption spectroscopy. However, hitherto, recordation of spectra exhibiting overtone absorption bands, in particular of aromatic amines, generated with aid of a modified microfiber, has not been reported. This has now been successfully achieved owing to addition of metal nanoparticles to the fiber; their presence appears to facilitate adsorption of the analyte molecules to the fiber, enabling measurement of overtones absorption bands which could not have been detected in the absence of the metal nanoparticles (abbreviated MNPs).

Accordingly, a first aspect of the invention is a method of analyzing a liquid sample, comprising the steps of:
passing near-infrared light through the sample, wherein the light travels in a MNPs-added microfiber that is immersed in the sample;
obtaining spectral information across a wavelength range of 750 nm to 2500 nm, specifically 750 nm to 1800 nm; and qualitatively identifying, and optionally quantitatively characterizing, one or more analytes in the sample.

As pointed out above, the method is particularly suited for the analysis of samples for the qualitative or quantitative identification of aromatic amines. Aromatic amine includes compounds having one or more (possibly fused) aromatic rings, for example, six-membered aromatic rings, with one or more amine group (e.g., primary amine —$NH_2$), wherein the amine group(s) is(are) generally bonded to ring carbon(s). However, other compounds having asymmetric bonds X—H wherein X is C, O, or S may create detectable absorption bands in the near infrared region and could therefore be detected by the method of the invention. Aqueous samples can also be analyzed by the method: water has less absorption in the NIR compared with mid IR and hence NIR spectra of aqueous samples recorded by the method of the invention may constitute a useful analytical tool.

Microfibers suitable for use in the invention can be fabricated from commercially available optical fibers, e.g., single mode fibers having core diameter in telecomm window the range from 8 to 9.5 µm, preferably from 8 to 8.5 µm. The core is generally made of silica glass, with refractive index in the range from 1.44 to 1.45. As mentioned above, the core is externally cladded with a suitable material to maintain the light within the fiber; cladding materials typically have refractive index in the range from 1.43 to 1.44. To render them suitable for use in the invention, these fibers are geometrically/structurally modified in order to affect the interaction of the evanescent field with the external medium to be analyzed, for example, by introducing a tapered section into the cylindrical fiber. Tapering techniques are known [Brambilla.G.: Optical fibre nanowires and microwires: a review; Journal of Optics 12(4) (2010)]. Briefly, the regular-sized fiber is heated and stretched to reduce its diameter, ultimately creating a tapered microfiber where the length and diameter of the tapered section (known as taper waist) are from 1 to 10 mm and from 1 to 3 µm, respectively. Accordingly, in a preferred embodiment of the invention, a MNPs-added tapered section of the microfiber, with the diameter set forth above, is immersed in the liquid sample and used as a sensor. The length of the tapered section may vary according to the intended use; for most applications, a length of about 1 to 10 mm may generally suffice.

MNPs for use in the invention are noble metals spheres (in particular gold, abbreviated herein AuNPs). Suitable metal nanoparticles suspensions are commercially available on the market, exhibiting narrow particle size distribution and are preferably near-monodisperse or monodisperse, with average diameter in the range from 10 nm to 500 nm, e.g., from 20 nm to 250 nm, as determined by the supplier (usually by scanning electron microscope). Addition of MNPs to the tapered section of the microfiber could be accomplished using different techniques, to effectively coat the glass surface of the tapered section, e.g., by means of electron vapor deposition, sputtering and other techniques. However, an elegant and precise technique—bearing in mind the frangibility of the tapered section—is to apply a tear size volume of the aforementioned suspension onto the sensing region of the microfiber. This is done by placing a drop of the suspension on a polytetrafluoroethene [PTFE; Teflon®] surface; the aqueous drop retains its shape due to the highly hydrophobic character of the PTFE surface. Then, by gently moving the "Teflon® tray" having the drop on its upper face and positioning it underneath the microfiber, the tapered section is wetted by the drop and the metal spheres absorb onto the external glass surface of the taper, as illustrated in FIG. 2.

The "sensor" section of the microfiber—namely, the tapering section of the microfiber with MNPs applied onto its surface—is preferably submerged below the surface of the liquid sample. It is convenient to use PTFE[Teflon®] surface as a sample holder on account of two useful properties: (1) Teflon® has low refractive index (1.3) relative to that of the silica fiber at the NIR wavelengths, which prevents leakage of the evanescent field and (2) Teflon® has high surface tension such that a sample droplet applied onto the surface does not spread out; it retains its globule shape and enables immersion of the "sensor" section of the microfiber in the sample. The aforementioned configuration particularly suits cases where just a fairly small volume of the sample is available for the measurement. If needed, the sample may be diluted before it is applied onto the surface of the sample holder. Organic solvents suitable for dilution include normal aliphatic hydrocarbons, e.g., hexane, which is devoid of spectral features in the NIR region, as illustrated in FIG. 1a. But dilution of course would rarely be needed in real measurements. It should be noted that other arrangements may be used, e.g., where the fiber is installed in a flow-through cell suitable for liquid analysis.

Spectral information collected to enable the characterization of the sample is generally displayed as a spectral image showing relationship of frequency or wavelength (spanning the 750-2500 nm range, preferably 1000-1800 nm range (abscissa); and absorbance, transmittance, intensity or power (ordinate). Quantitative analysis is also possible, because NIR absorbance follows the Beer-Lambert Law (absorbance depends of the concentration of the analyte in the sample).

A modular schematic illustration of NIR spectrophotometer which could be used to obtain spectral information according to the method of the invention is shown in the photo of FIG. 3A and the corresponding modular schematic top view illustration in FIG. 3B. The Near-infrared spectrophotometer (1), which forms another aspect of the invention, comprises:

A light source (2) generating near-infrared light to be guided through optic microfiber (3) having metal nanoparticles-added section, wherein said section of the microfiber has a tapered configuration (7), a sample holder (4) for providing an interface between a sample and said metal nanoparticles-added tapered section of microfiber (7), and analysis unit (5) producing the spectral information.

Light source (1) may be provided by tungsten halogen incandescent lamps which are commonly used as polychromatic light sources in NIR spectroscopy. However, preferred are laser sources, known as supercontinuum sources, which are able to deliver broadband spectrum with single mode beam characteristics and are readily applicable to coupling with fibers. The microfiber (3) could be directly coupled to light source (1). Alternatively, as shown in FIGS. 3A and 3B, the output of light source (1) is launched through a lens (6) into the microfiber (3). However, lens (6) is not essential.

The features of the microfiber (3) and the sample holder (4) are as described above. That is, the tapered section of the microfiber is preferably provided with gold nanoparticles on its surface. The sample holder comprises a surface made of a material with high surface tension, i.e., polymer with 'anti-stick' properties, e.g., a PTFE surface.

Analysis unit (5) is designed to measure and display the distribution of power of an optical source over a specified wavelength range, producing a plot of power (ordinate) and the wavelength (abscissa), which in turn could be translated into transmittance spectrum in DB units.

The uniqueness of the device lies is its portability, miniaturization and molecular fingerprints detection in near-infrared. In addition, the biocompatibility of silica fibers places them as winning candidates for biomedical monitoring applications.

IN THE DRAWINGS

FIG. 4 shows photographs of the experimental arrangement used and the sculptured microfiber architecture. FIG. 4A shows an experimental set-up based on butt-coupled broadband illumination of a microfiber by a supercontinuum NIR source. The transmittance spectra are collected by an optical spectrum analyzer. FIG. 4B is a photograph of the microfiber fixed on the holder with magnets and a Teflon spacer used for holding the sample. FIG. 4C is a schematic representation showing light guided in a tapered glass microfiber sculptured with gold nanoparticles. FIG. 4D is a schematic representation (not to scale) of the diameters of the nanoparticles used in the experimental work reported below.

Figure 5A:
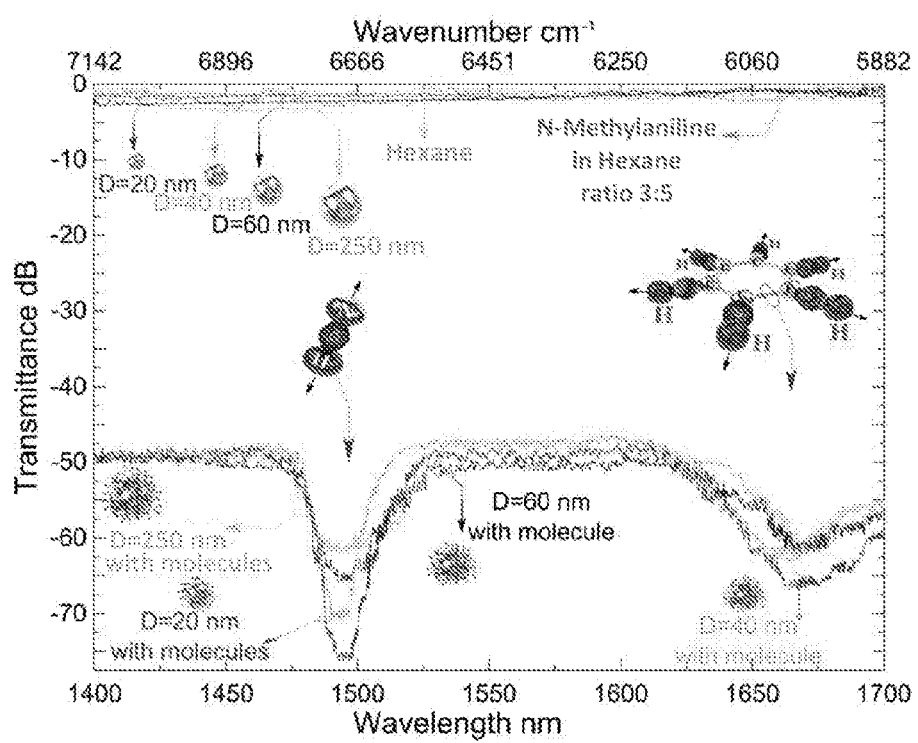
Figure 5B:
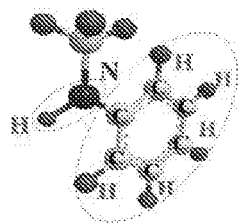
Figure 5C:

FIG. 5 shows the results of the measurement using the microfiber. FIG. 5A is the transmittance spectra recorded with the microfiber. NMA spectra detected on microfibers sculptured by different nanoparticles sizes show clear overtone absorption bands of (N—H)-bond stretching band around 1.5 µm and the aryl (C–H) overtone stretching band around 1.65 µm in the $\Delta V=2$ transitions (transition from ground state to second excited vibrational state) for 1:3 NMA:hexane proportioned mixture. Upper curves represent the transmittance spectra of the microfiber embedded in hexane alone, NMA alone and suspension of gold nanoparticles alone, respectively. Lower curves represent the transmittance spectra generated with the aid the gold nanoparticles-containing microfiber immersed in the organic mixture consisting of hexane and NMA; FIG. 5B shows the chemical structure of NMA and FIG. 5C is the skeletal molecular shape of NMA.

Figure 6:
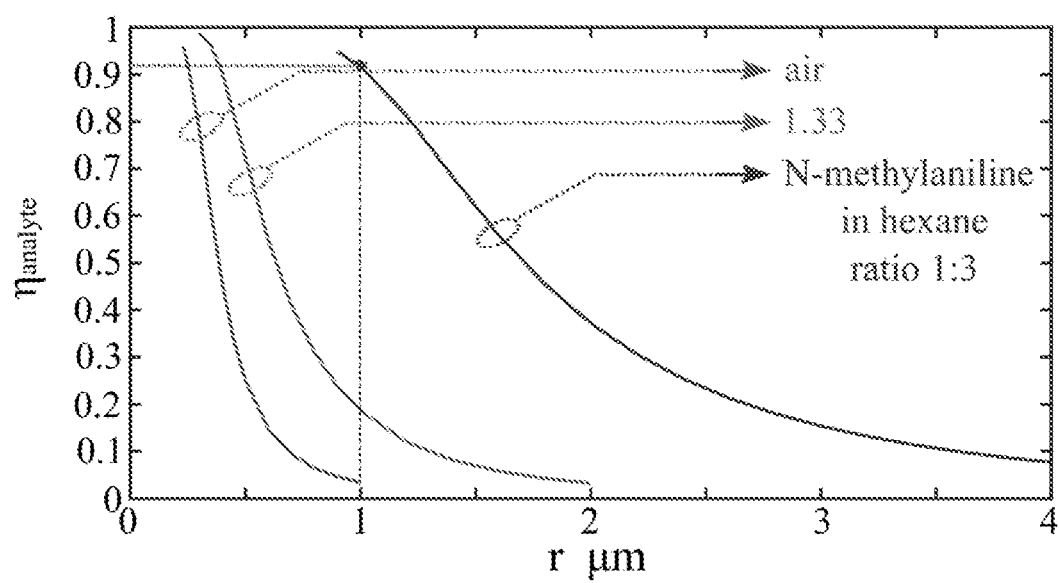

FIG. 6 shows the results of numerical modeling, providing a plot of the calculated fraction of the power in the analyte against radius of a microfiber immersed either in air, water or a NMA:hexane mixture.

EXAMPLES

Example 1

Detecting Aromatic Amine with the Aid of NIR Spectra Recorded by AuNPs-Added Microfiber Microfibers were fabricated by tapering conventional SMF-28® fibers. The tapering procedure was based on the modified flame brushing technique, as described by Brambilla [Optical fibre nanowires and microwires: a review; Journal of Optics 12(4) (2010)], in which a microheater is used to heat the fiber locally toward its softening point. Once heated, the microfiber is pulled longitudinally with microstages to reduce its diameter. Eventually, the fiber core is replaced by the cladding, and the cladding effectively becomes the core of the microfiber, thereby producing a tapered region of 2 µm in diameter, which consists of the cladding material. When the tapered microfiber is used as a guided wave analytical tool, the analyte solution becomes the "new cladding". Losses of microfiber material were minimized by accurate modeling of the microfiber profile, as described by Birks et al. [The shape of fiber tapers; Journal of Lightwave Technology, 10(4) p. 432-438 (1992)].

Four types of gold nanoparticles were tested for their ability to improve the performance of the sensor, as tabulated below. Gold nanoparticles, commercially available in the form of aqueous suspensions from BBI, were applied onto the surface of the tapered section by the technique described above (with the aid of Teflon® surface).

TABLE 1

| Particles radius (nm) | Concentration (number per ml, according to manufacturer) |
|---|---|
| 20 | $7 \times 10^{11}$ |
| 40 | $9 \times 10^{10}$ |
| 60 | $2.6 \times 10^{10}$ |
| 250 | $3.6 10^{8}$ |

Figure 1A:
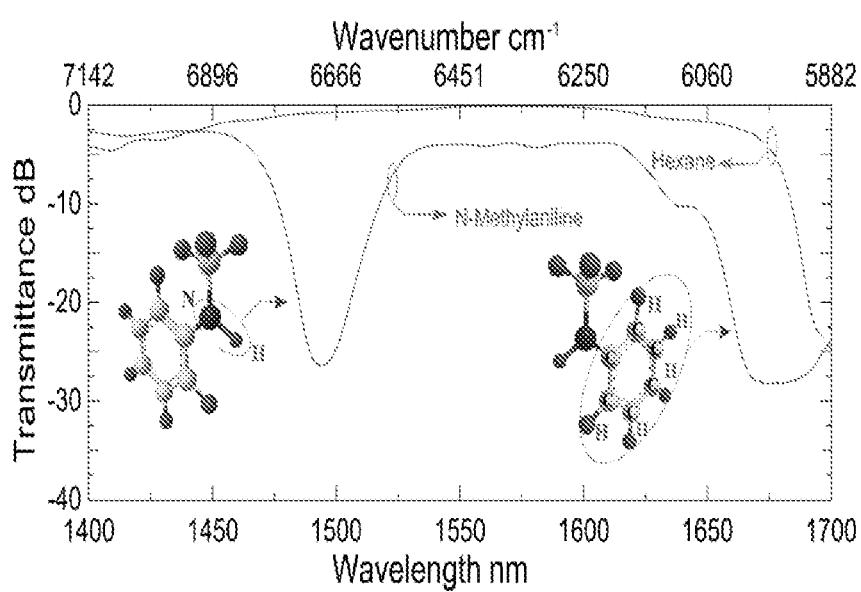
FIG. 1 is NIR spectra of N-methyl aniline recorded using conventional spectrophotometer.
Figure 1B:
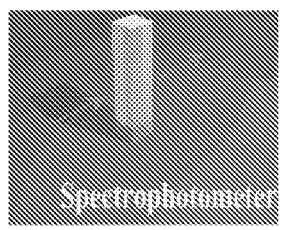
Figure 2:
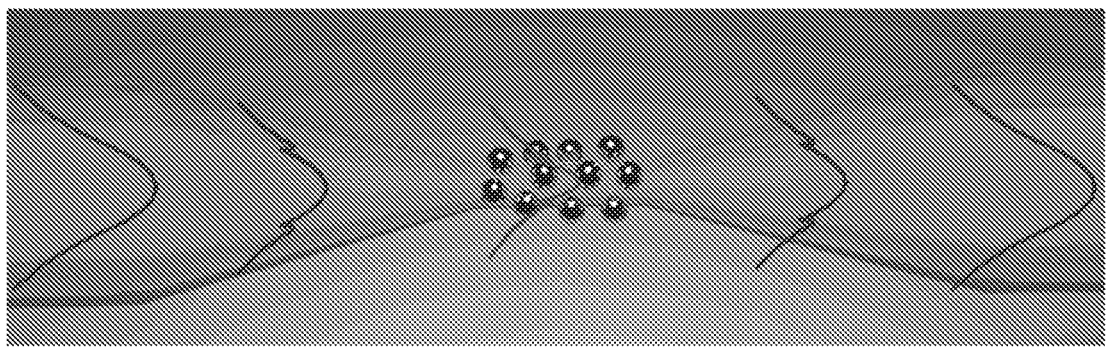
FIG. 2 shows the structure of the tapered section of a microfiber with gold spheres deposited onto its surface (i.e., the sensing region).
Figure 3A:
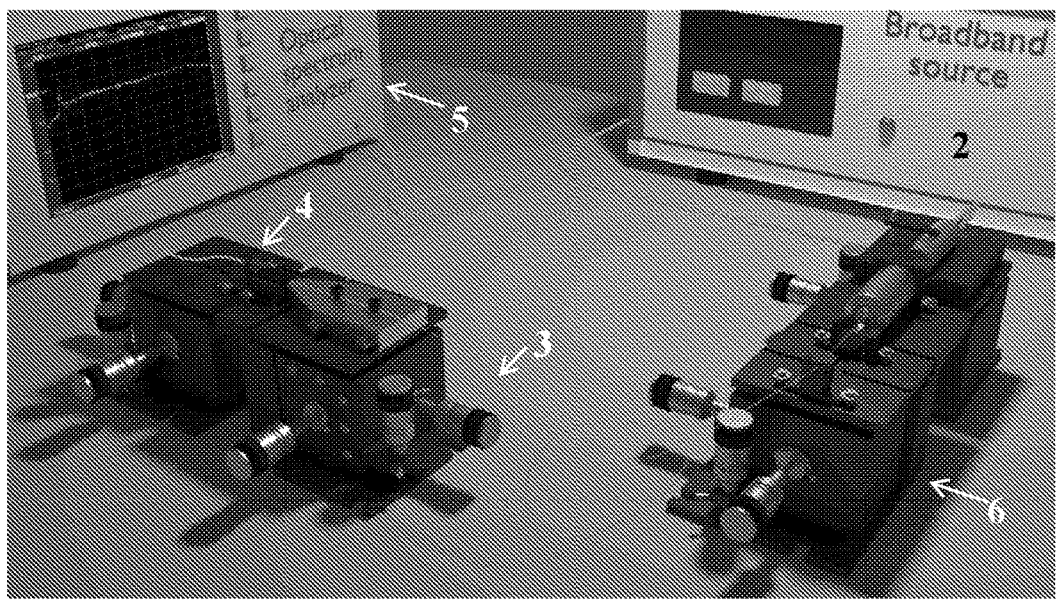
FIGS. 3A and 3B are photo and a top view schematic illustration, respectively, of a spectrophotometer of the invention, showing its major parts.
Figure 3B:
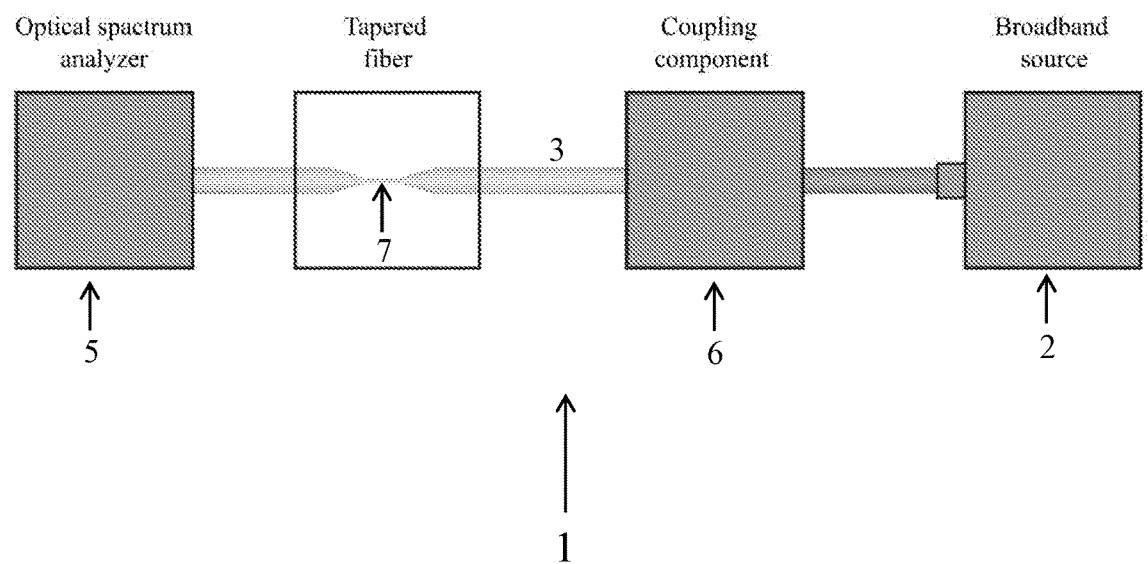
Figure 4A:
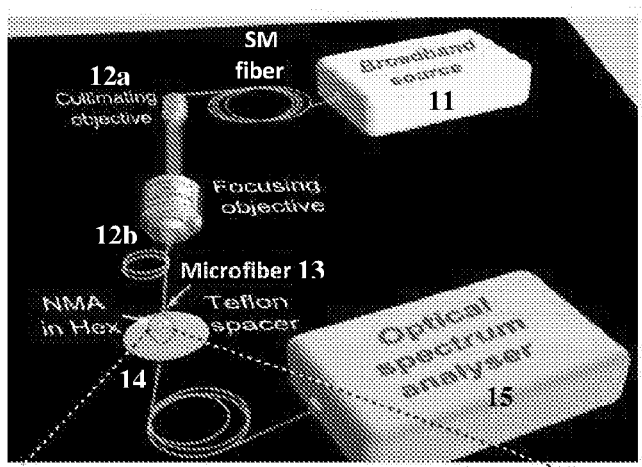
Figure 4B:
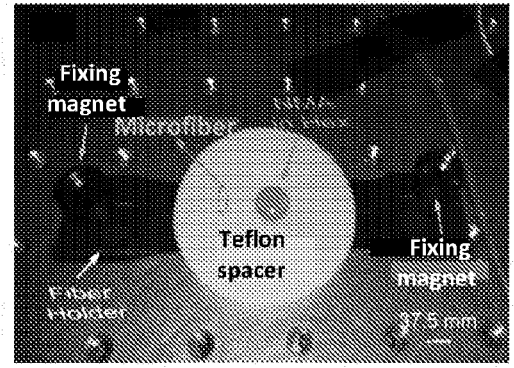

Optical microfiber measurements of transmittance spectra were conducted using the experimental setup shown in FIG. 4a. NIR light was generated by a high-power supercontinuum fiber source (11) operating at a central wavelength of 1060 nm, with a spectral bandwidth spanning 450 nm to >1750 nm and generating optical pulses of less than 10 ps duration (Fianium SC-600-FC). Broadband light was collimated (12a) and focused onto the microfiber using an objective NA of 0.25 and ×10 magnifications (12b). The power transmitted through the microfiber (13) was collected while the microfiber was coupled directly into an optical spectrum analyzer (15) (OSA, Yokogawa AQ6370). Spectral resolution was set at 0.5 nm. The acquisition time for the 300-nm spectral window was about 50 s. No polarization dependency was observed. The refractive index of pure N-methyl aniline (NMA) is 1.57118 which is much higher compared to the index of silica fibers. Therefore, the refractive index of NMA was reduced by diluting the amine with hexane (Hex), having a refractive index of 1.37508, to a ratio of 1:3 NMA:hexane (the refractive indexes of the liquids were measured with an RA 510 refractometer operating at 589 nm at a room temperature of 21±2° C.). A Teflon spacer (14) prevented contamination of the device. The low refractive index of the Teflon (1.3) relative to that of the silica fiber (1.43) at the NIR wavelengths of NMA vibrations prevented leakage of the evanescent field. In FIG. 4b, a photograph of the device is provided, showing that the fiber holder contained two magnets to fix the fiber in place and that a single droplet of the mixture of NMA in hexane was applied onto the tapered region of the microfiber above the Teflon spacer, i.e., the fiber is submerged below the surface of the organic droplet. The organic droplet does not spread-out and retains its globule shape due to the high surface tension of the Teflon surface.

Figure 4C:
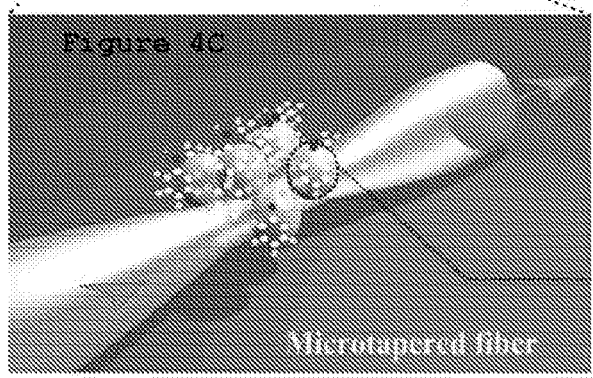
Figure 4D:
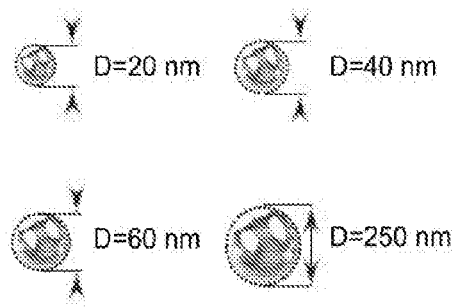

FIG. 4c is a schematic representation of the microfiber sculptured with gold nanoparticles, and FIG. 4d shows the relative dimensions (not to scale) of the four types of spherical nanoparticles that were tested as tabulated in Table 1 above.

The transmittance spectra that were recorded are shown in FIG. 5A. The lower and upper abscissas indicate the wavelength (nm) and the wavenumber (cm$^{-1}$), respectively, whereas the ordinate indicates the transmittance in dB units. It is seen that NIR spectrum generated using a bare microfiber that had not been "decorated" by gold nanoparticles does not exhibit the characteristic bands of NMA (upper spectra in FIG. 5A). However, NIR spectra generated with the aid of microfibers decorated with gold nanoparticles can be used to detect NMA, seeing that the characteristic bands are observed in the NIR spectra (lower part of FIG. 5A). In the experiment reported herein, a microfiber with 4-mm long tapered region, transmitted with the maximum loss of ~25 dB around the N—H vibration band of NMA (blue curve on FIG. 5A).

Example 2

Numerical Modeling

The microfibers were modeled using COMSOL Multiphysics 5 available. To explore theoretically the modes propagating in the microfiber waist, a two-layer system was assumed for microfibers of 2 µm in diameter and less. Since the effect of the doped silica core vanishes at microfiber diameter a few times the wavelength, the cladding of the original fiber was assumed to be the new core and the new cladding to be air or the NMA in hexane mixture. Hence in the model, the first layer consists of a silica core having a refractive index of 1.44; this layer is surrounded by a second layer, which consists of either air, water or the organic (NMA:hexane) mixture.

The goal of the theoretical study was to evaluate how the diameter of the microfiber affects the distribution of the optical power between the core and the surrounding molecular medium illuminated by the evanescent field of the microfiber. The fractions of optical power in the core (designated $\eta_{core}$) and in the surrounding molecular medium (designated $\eta_{evan}$ or $\eta_{analyte}$) are calculated as follows:

$$FoM = \eta_{evan} = P_{evan}/P_{total}$$

$$= \int_{sup} SdA / \int_{-\infty}^{\infty} SdA$$

$$\eta_{core} = P_{core}/P_{total} = \int_{core} SdA / \int_{-\infty}^{\infty} SdA$$

(S is the time average pointing vector and A is cross sectional area).

FIG. 6 shows the change of the power fraction in the evanescent tail ($\eta_{analyte}$) as a function of the microfiber radius immersed in air, water (refractive index of 1.33) or the NMA:hexane mixture. It may be concluded from the plot in FIG. 6 that the fraction of the power extending into the medium of higher index increases with decreasing core diameter. For microfibers of r=1 μm immersed in the analyte mixture, most of the light is expected to be conducted beyond the physical boundaries of the microfiber. Since more than 90% of the total power would be expected to be carried in the evanescent tail (η0.9), such a system appears to lend itself for applications such as sensing and detection.

However, contrary to the theoretical expectation indicating that about 92% of the light is in the medium, in the experiment it was impossible to detect the analyte under consideration (NMA) with the aid of the bare microfiber devoid of gold. The experimental results reported in Example 1 show that an optical configuration created by tapering the fiber is insufficient, despite the indication drawn from of the model, and the application of gold nanoparticles onto the surface of the taper waist is necessary to achieve acceptable sensitivity. Without wishing to be bound by theoretical explanation, it seems that NMA molecules are attracted to the electronegative materials such as gold and the ensemble molecule+MNPs are adsorbed on the microfiber to reach sufficient sensitivity.

What is claimed is:

1. A method of analyzing a liquid sample, comprising:
   passing near-infrared light through the sample applied onto a polytetrafluoroethylene (PTFE) surface, wherein the light travels in a microfiber, to which metal nanoparticles have been added, wherein the microfiber has a tapered section, which is immersed in the sample;
   obtaining spectral information across a wavelength range of about 750 nm to about 1800 nm; and
   qualitatively identifying, and quantitatively characterizing, one or more analytes in the sample.

2. A method according to claim 1, wherein the analyte is an aromatic amine.

3. The method according to claim 2, wherein the sample is a droplet sample.

4. A method according to claim 1, wherein the metal nanoparticles are gold nanoparticles with average particle size in the range from 20 to 250 nm.

5. A method according to claim 1, wherein a tapered section of the microfiber is immersed in the sample, said tapered section having the gold nanoparticles on its surface.

6. A method according to claim 5, wherein the metal nanoparticles were added to the tapered section by applying a suspension of the nanoparticles onto the surface of the tapered section.

7. A near-infrared spectrophotometer comprising:
   a light source generating near-infrared light to be guided through optic microfiber having metal nanoparticles-added section, wherein said section of the microfiber has a tapered configuration, a sample holder comprising a polytetrafluoroethylene (PTFE) surface for providing an interface between a sample and said metal nanoparticles-added tapered section of microfiber and analysis unit producing the spectral information.

8. A near-infrared spectrophotometer according to claim 7, wherein the tapered section of the microfiber is provided with gold nanoparticles on its surface.

* * * * *